United States Patent [19]
Currie

[11] 3,921,076
[45] Nov. 18, 1975

[54] METHOD OF AND APPARATUS FOR LOCATING PREDETERMINED PORTIONS OF A RADIO-FREQUENCY PULSE, PARTICULARLY ADAPTED FOR LEADING EDGE LOCATION OF LORAN AND SIMILAR NAVIGATIONAL PULSES

[75] Inventor: John M. Currie, Westford, Mass.

[73] Assignee: International Navigation Corporation, Bedford, Mass.

[22] Filed: Mar. 8, 1973

[21] Appl. No.: 339,182

[52] U.S. Cl............. 325/321; 178/69.5 R; 343/103
[51] Int. Cl.²........................................ H04L 7/00
[58] Field of Search.......................... 325/321–326, 325/42, 58, 65, 82; 343/103; 178/69.5 R; 179/15 BS, 15 TC; 328/155

[56] References Cited
UNITED STATES PATENTS

| | | | |
|---|---|---|---|
| 3,337,723 | 8/1967 | Etnyre | 325/325 |
| 3,594,502 | 7/1971 | Clark | 178/69.5 R |
| 3,597,539 | 8/1971 | Clark | 179/15 BS |
| 3,798,378 | 3/1974 | Epstein | 178/69.5 R |
| 3,812,430 | 5/1974 | Schmidt et al. | 178/69.5 R |

*Primary Examiner*—Benedict V. Safourek
*Attorney, Agent, or Firm*—Rines & Rines

[57] ABSTRACT

This disclosure is concerned with locating the leading edge of radio-frequency pulses, such as ground-wave Loran transmissions, by sampling the received signal information backwardly until no signal information is present, then sampling forwardly in narrower time intervals until signal information reappears, and then forward-sampling to lock on to a predetermined cycle.

25 Claims, 5 Drawing Figures

METHOD OF AND APPARATUS FOR LOCATING PREDETERMINED PORTIONS OF A RADIO-FREQUENCY PULSE, PARTICULARLY ADAPTED FOR LEADING EDGE LOCATION OF LORAN AND SIMILAR NAVIGATIONAL PULSES

The present invention relates to methods of an apparatus for locating predetermined portions of radio-frequency pulse envelopes, being more particularly directed to locating the leading edge of received Loran-C or similar navigational pulses that are generally received along multiple paths such that the desired ground-wave received pulse becomes contaminated near its leading edge by sky-wave return pulses from the same transmission.

Various proposals have heretofore been made for locking onto a predetermined portion of the leading edge of, for example, a Loran-C navigational pulse, received via a ground-wave transmission, by vehicles such as boats or the like, thereby enabling their navigation or position location. Since the sky-wave transmission path causes reception shortly after the ground-wave pulse is received, as a result of the somewhat longer path of transmission by way of the reflection from the ionosphere or other above-the-earth reflecting layers, the Loran receiver has difficulty in discriminating against the sky-wave pulse and identifying the desired leading edge of the ground-wave pulse — the only pulse that can reliably be used for such navigational uses. Various types of searching mechanisms have accordingly been evolved for this purpose such as those employed in the Sperry Gyroscope Co., ARN 78 and ARN 85 Loran-C Receivers, or the LFE-Epsco, ARN 94 and AN/PSN-2 Receivers, or the Decca ADL-21 Receivers. The first are described, for example, in maintenance manuals having the military nomenclatives ARN 78, 85, 94 and AN/PSN-2 of the United States Air Force and Army Electronic Command at Fort Monmouth, New Jersey.

The best technique that has been developed to date for attempting to solve this problem of contamination by the subsequent overlapping sky-wave pulse and trying to locate the leading edge of the ground-wave pulse emanating from the Loran transmitting stations, has involved monitoring a predetermined time interval ahead of the cycle sample point in the monitoring of the received pulses. If signal information is determined to be present, the sampling is then effected in successive time intervals, backwardly. By this technique, it is assumed that the sky-wave has been missed or avoided and that the received signal information is in the leading edge of the ground-wave signal. Unfortunately, this can often be in error, particularly where the signal-to-noise ratio is poor, and inadvertent locking can be made on the fourth or fifth cycle without knowledge of the error. It is also an expensive function to perform, requiring a large amount of data processing circuitry. This, however, has been the best that the art has been able to come up with to date in spite of considerable effort at solving the problem.

In accordance with the present invention, on the other hand, it has been discovered that a novel searching procedure can completely obviate such error problems in these prior art systems; and fortuitously, the invention requires less equipment in terms of digital accumulators and related devices than such prior-art circuits, thus enabling a less expensive and more reliable receiver to be attained. Specifically, and in summary, the invention involves monitoring for the pulse envelope transmissions and searching for signal information during such monitoring which, upon being found or located, enables sampling the signal information backwardly in predetermined successive time intervals (such as 30-micro-second intervals in the before-mentioned Loran-C example) which are relatively wide compared with the radio-frequency cycle period, until such time as no signal information is any longer present. This means that the backward cycling has gone beyond the onset of the ground-wave signal and insures that subsequent forward sampling in different narrower predetermined successive time intervals (such as 10 microseconds — substantially the period of the radio-frequency underlying the envelope) enters the leading edge of the ground-wave received signal with no fear of contamination by the subsequent sky-wave signal. Once signal information thus reappears during the forward sampling, in accordance with the invention, monitoring continues by subsequent forward sampling until the onset of a predetermined cycle is determined, as explained in detail hereinafter.

While, moreover, the invention is described in connection with the preferred and urgent illustrated application to Loran-C and similar navigational receiver systems, it will be evident that the invention is more generically applicable to the location of predetermined cycles or portions of radiofrequency pulse envelopes wherein the same problems of lack of accuracy and/or spurious operation are involved. It will, of course, be evident that other Loran-type navigational receivers may also employ the techniques of the invention.

An object of the invention, accordingly, is to provide a new and improved method of and apparatus for locating predetermined cycles in a transmitted radio-frequency pulse envelope that shall not be subject to the spurious performance before-described, but that accurately insures the location of the desired received region of a pulse and additionally enables the use of somewhat less complex and less costly equipment to practice the technique of the invention.

A further object is to provide such a novel method and apparatus that are particularly adapted for locating the leading edge of navigational transmitted pulses and the like.

Still a further object is to provide a novel method and apparatus that solve the sky-wave contamination problem in Loran-C and similar radio systems, insuring positive locking onto the leading edge of the ground wave received signal without any possibility of spuriously locking onto an undesired cycle thereof.

Other and further objects will be explained hereinafter and are more particularly delineated in the appended claims.

The invention will now be described in connection with the accompanying drawing, FIG. 1 of which is a detailed block and schematic diagram illustrating an apparatus in preferred form for the practice of the novel method of the invention;

Figure 1:
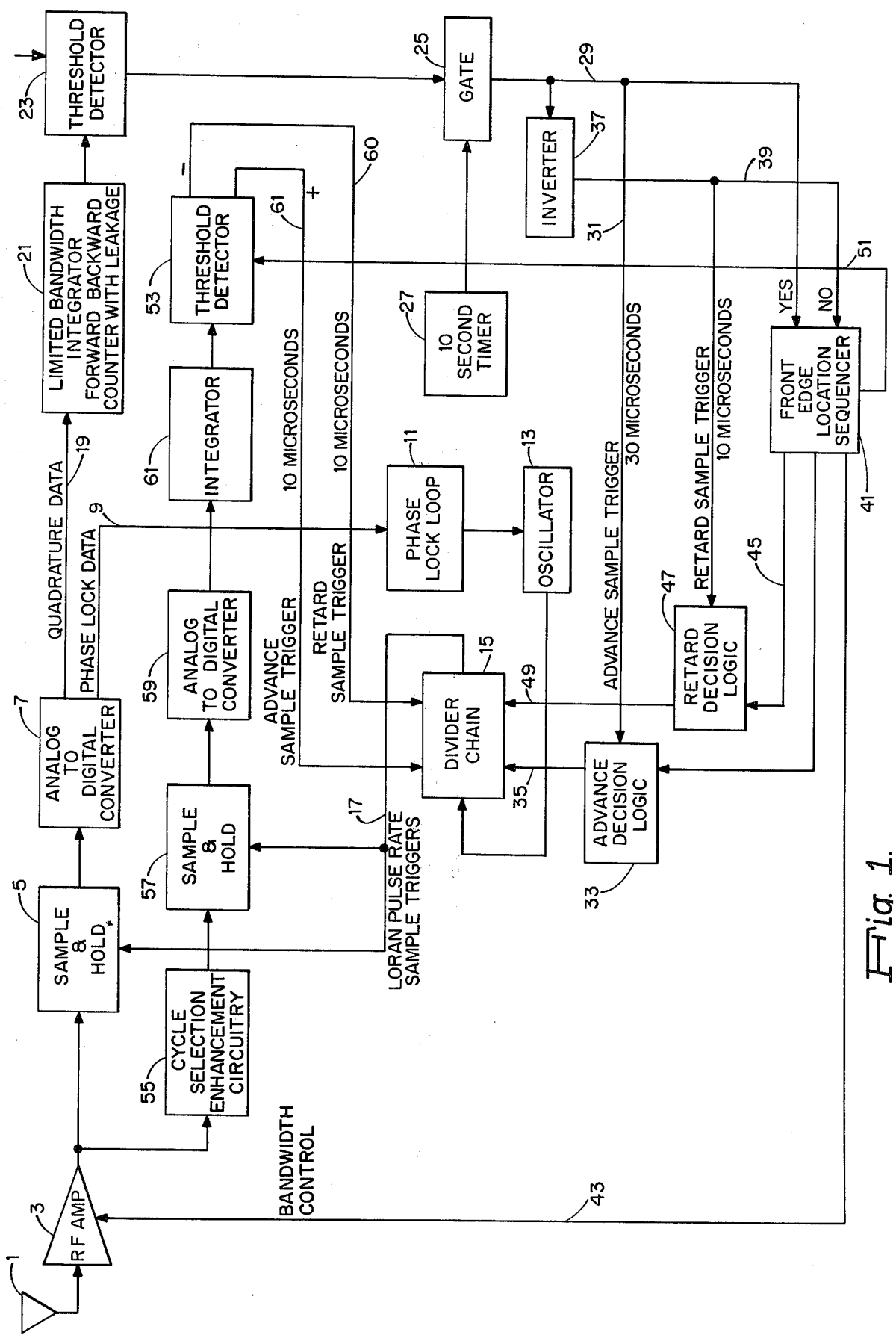

Referring to FIG. 1, illustrated in connection with the Loran-C or similar type systems as a preferred embodiment, an antenna is shown at 1 that may be located on a vehicle, such as a ship, that desires to navigate through the reception of these Loran transmitted pulses, the antenna receiving both the before-mentioned ground and sky-wave pulses resulting from the transmission. The received signals thus monitored are shown fed to a radio-frequency amplifying section 3, the output of which is fed to a sampling and holding circuit 5 and thence to an analog-to-digital converter 7 which adapts the signal or processes the same for subsequent use in the hereinafter-described logic circuits.

One of the outputs 9 from the analog-to-digital converter 7 is used as a phase-lock data source for a phase-lock circuit 11 which feeds an oscillator 13 to control the frequency thereof, driving a divider chain 15 the output of which triggers the sample and hold circuit 5 by way of path 17. The phase-lock signal from 11, by varying the frequency of the oscillator 13, insures that the sample trigger at 17 is at the zero crossings of the successive cycles of the radio-frequency carrier of the received Loran pulses. Referring, for example, to FIG. 2A, the ground-wave pulse envelope is shown formed by the thin line of successive radio-frequency cycles; and the delayed pulse received from the first sky-wave of greater amplitude than the ground wave, is illustrated in dotted lines overlapping to the right. Obviously there may be more than one delayed sky-wave, and the signal illustrated is intended to represent the last such sky-wave of sufficient signal strength to be received, it being noted that gaps exist between the successive sky-wave received pulses. The before-mentioned problem of the contamination by the closein sky-wave signal of the ground-wave signal is illustrated as occurring in between the third and fourth cycles; specifically, if Loran-C is involved, having a radio-frequency cycle period of the order of 10 microseconds, approximately 35 microseconds after the onset of the ground-wave received pulse. Under standards set for these navigational systems, it has been provided that the minimum sky-wave delay that receivers must be able to accommodate is such a 35 microsecond interval. The far delayed sky-waves, however, can be of even 500 to 1000 microseconds delay.

As before stated, the problem is to lock onto the onset of a predetermined ground-wave pulse leading edge cycle selected as the third cycle in the leading edge of the pulse envelope, indicated at a location labeled "Desired Tracking". Each pulse measured by the Loran receiver must have its measurement made at this same desired tracking point in order to provide accurate navigation. The sample trigger of the sample and hold circuit 5 effected from the phase-lock oscillator 13 of FIG. 1 is labelled "Phase-Lock Sample Trigger" in FIG. 2B, and is shown occurring at the end of the second cycle. The digital logic circuitry in the divider chain 15 causes a train of pulses actually to be fed to the sample and hold circuit via the path 17. The center or phase-lock sample trigger pulse of FIG. 2B is accompanied by a preceding cycle selection sample trigger, say 2½ microseconds earlier than the phase-lock sample trigger pulse, and a so-called found signal detector sample trigger pulse occurring 2½ microseconds after of the phase-lock sample trigger.

The data that is detected by the triggering of the sample and hold circuit 5 by the detector sample trigger pulse is referred to as the quadrature data and its output from the analog-to-digital converter 7 is shown applied at 19 to a limited bandwidth integrator 21 which may be realized by a forward-backward counter with certain leakage, later explained. A threshold monitoring detector 23 receives the output of the limited bandwidth integrator 21 and, upon the advent of a predetermined threshold, triggers a gate 25, operable in 10-second timer searching intervals from a timer 27, to control whether the before-mentioned 30 microsecond backward predetermined time interval sample searching is effected, or whether the narrower 10 microsecond forward searching mode is to be used. If there is a "yes" signal at the output 29 of the gate 25, indicating that the threshold in the threshold detector 23 has been reached or exceeded in the 10-second time interval (that is, that signal information has been located), the output at 29 will be applied via conductor 31 as an advance sample trigger command for controlling the advance decision logic at 33 by applying extra triggers at 35 into the divider chain 15, such that the Loran pulse rate sample trigger output thereof, fed at 17 to the sample and hold circuit 5, will occur 30 microseconds earlier. If, on the other hand, the output of the gate 25 comprises a "no" answer, this is fed through an inverter 37 along a no 39 to to a frontedge location sequencer 41 which determines, by way of conductor 43, whether the bandwidth of the RF amplifier 3 be widened or not.

The sequence starts with the first finding of signal information which causes an immediate advance of the sample triggers by 30 microseconds.

As before explained, if, during the second 10-second operation of the timer 27 no signal information has been received, then the front-edge location sequencer 41 will, via conductor 43, widen the bandwidth of the RF amplifier 3 to extend the effective resolution of the monitoring of the receiver. If, however, during the next 10-second interval of the timer 27 no signal information has yet been received that exceeds the predetermined threshold of the threshold detector 23, then the front-edge location sequencer 41 is assured that it is ahead of the front edge of the ground-wave signal. The front-edge location sequencer 41 therefore applies an output 45 to a retard decision logic circuit 47 which is connected also to the output of the inverter 37, thus to permit the logic circuit 47 to be triggered by the retard sample trigger in 10-microsecond intervals, thereby subtracting the trigger at 49 in the divider chain 15 so as to retard the triggering, via 17, of the sample and hold circuit 5. This causes successive searching in successive 10-microsecond intervals, moving toward the ground-wave pulse onset. When the signal-to-noise ratio detected by the receiver is adequate, indicating that signal information of the necessary threshold has indeed been detected for tracking, the output of the gate 25 becomes yes again, and the front-edge location sequencer 41 terminates the operation of the retard decision logic circuit 47. Front-edge location has thus now been positively determined.

It now remains to lock onto the desired tracking point at the zero crossing at the end of the predetermined third cycle of the radio-frequency pulse carrier within the receiver pulse envelope. The front-edge location sequencer 41, by way of its third output 51, removes an inhibit block on a further threshold detector 53 that is part of this third cycle selection circuitry. That circuit is shown comprising a cycle-selection enhancement circuit 55, the input of which is fed from the RF amplifier stage 3 and which, in turn, feeds a further sample and hold circuit 57, also triggered from the Loran pulse rate sample trigger path 17. The output of this sample and hold circuit 57 is fed to a second analog-to-digital converter 59, the output of which is integrated at 61 and applied to the before-mentioned threshold detector 53, the inhibiting control of which has thus been removed by the front-edge location sequencer 41 by way of its connection 51.

The front-edge location circuitry has thus now enabled the positive determination of the ground-wave signal such that any standard cycle locating and locking circuitry may accomplish the desired result of locking onto a predetermined portion of a predetermined cycle. The operation of the preferred system embodying elements 53, 55, 57, 59 and 61 will now be described.

Figure 3:
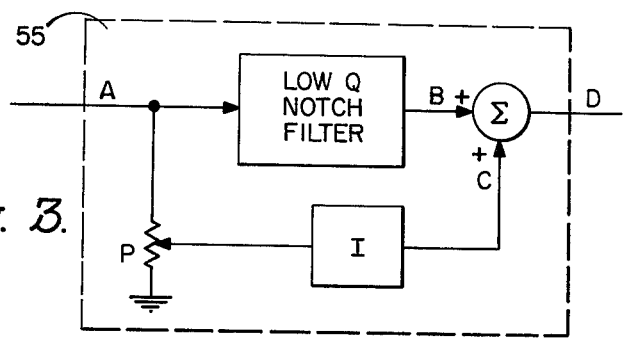
FIG. 3 is a circuit diagram of a preferred cycleselecting circuit for operation in the system of FIG. 1.
Figure 4:
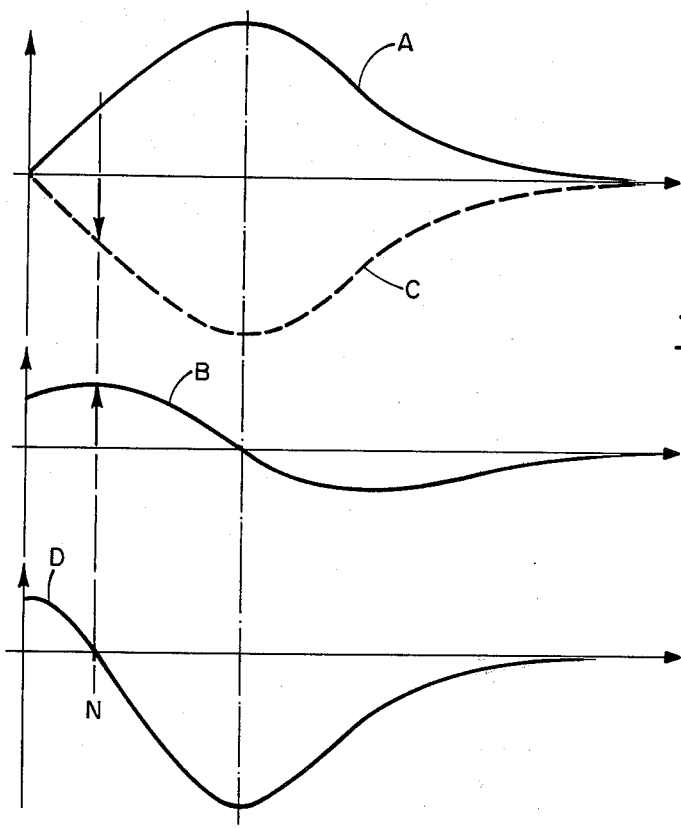
FIGS. 4 and 5 are further explanatory waveform diagrams.
Figure 5:
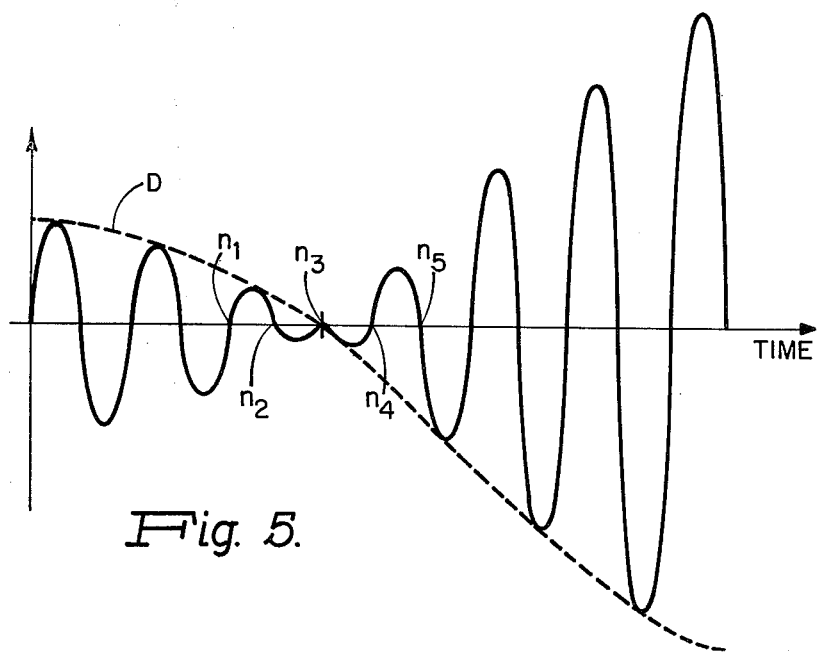

The cycle selection enhancement circuit 55 in FIG. 1 is shown in FIG. 3 implemented by a low-Q notch filter, a summing network, an adjustable resistor P, and an inverter I. That low-Q filter provides accurate differentiation of the input signal such that the envelope of the input waveform, illustrated at A in FIG. 4, is converted to an output envelope waveform B, therebelow. The input waveform A is attenuated by the adjustable potentiometer P and then inverted at I and summed at $\Sigma$ together with the derivative output B of the notch filter signal. The resultant waveform D, FIGS. 3 and 4, at the output of the summing network crosses the zero axis at null point N, which can be made to move depending upon the position of the potentiometer P. Such operation is only obtained if the notch filter is tuned to the carrier frequency, in which event, the filter acts like a differentiating circuit. Since a change in polarity of an envelope waveform can only occur at discreet times (namely, the nulls or zero-crossings) the output RF waveform D from the selection circuit 55 assumes the form shown in FIG. 5, with phase reversal occurring at point N, FIG. 4. By adjusting potentiometer P, this phase reversal can be made to occur at any desired point, such as points $n_1$ through $n_5$ in FIG. 5. Point $n_3$, however, is selected to be the predetermined cross-over point, after the end of the third cycle, so as to permit operation free from sky-wave contamination, as previously explained.

Figure 2:
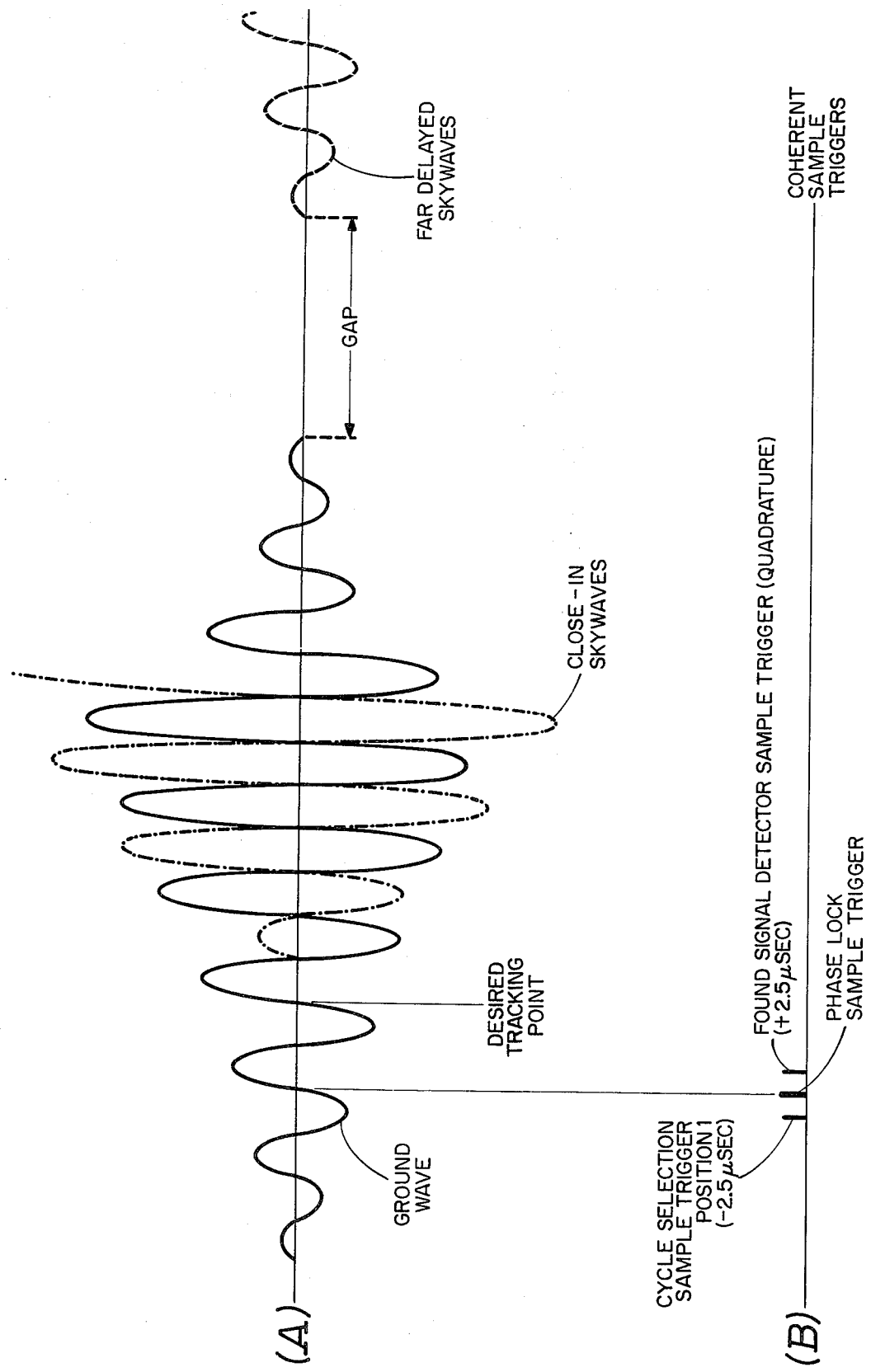
FIG. 2 is a series of waveform diagrams explanatory of the operation of the system of FIG. 1.

The output of the selection circuit 55 is now sampled by the cycle selection sample trigger shown in FIG. 2; and is fed via analog-to-digital converter 59 to the integrator 61. Should the receiver be sampling ahead of the cross-over point N of waveform D in FIG. 4, the output of the integrator 61 will become negative. The threshold detector 53 will respond to this and cause the sample triggers to be retarded by 10 microsecond along path 60. Should the data being integrated, however, indicate that the cross-over N has been passed, then the data will become positive, the positive threshold will be exceeded and the sample triggers will be advanced 10 microseconds. In this manner, a closed loop cycle selection function is completed. The point now selected ($n_3$ in FIG. 5) is the third cycle, as predetermined by the action of setting potentiometer P of FIG. 3, as previously Suitable circuitry for performing the functions shown in the drawings may be as follows: The sample and hold circuits utilized for a hard limited processing receiver 5 and 57 may, for example, be of the Fairchild or Texas Instrument Company type SN 7474 flip flop, or the SN 74S112 JK flip flop, TI. The analog-to-digital converter function may similarly be achieved simultaneously by these same circuits. The integrators may comprise SN 74192 forward-backward counters of the said Fairchild and Texas Instrument Companies. Similarly the divider chain, timer, limited bandwidth integration, etc. may be composed of similar types SN 7400, 7410, 7474, 7490 and other well-known members of the 7400 family of micro-circuit components. Such devices are also manufactured under the same type numbers by National Semi-Conductor and ITT Semi-Conductor Companies. Other wellknown circuits for performing there functions may also be employed, as is known in the art.

In actual operation, a successful receiver of this type has been tested by the assignee of the present application for Loran-C operation. This function has been built into a successful INTERNAV 101 Loran-C navigation set fabricated by the International Navigation Corporation of Waltham, Massachusetts, employing Texas Instruments Series 74 microcircuitry and RF circuitry embodying standard transistors, resistors and capacitors and functioning over a temperature range from 0°C to +55°C. Successful operation in the Loran-C environment was attained in each of the United States, Canada, Norway and Great Britain. Many varied sky-wave conditions were encountered during the test phases. The receiver operated as close as 50 miles from station and as far away from 1500 miles from station. In all cases, when ground-wave signal-to-noise ratio was within the system tolerance, that is −20db signal-to-noise ratio or better, the receiver successfully front-edge located. That is, the receiver successfully discriminated between sky-waves and ground-waves and unambiguously locked to the ground wave. This is to be contrasted with prior receivers at medium to extreme ranges, that, ten percent of the time, have at least one of their three tracking loops lock onto a combination of ground-wave and sky-wave signals.

As a result of embodying in the front-edge location scheme the otherwise required found-signal detectors, moreover, the invention enables the saving of parts in the receiver, thereby providing a system that is more cost-effective than present-day equipment, as well. Because the invention time-shares the limited bandwidth integrators utilized in the found-signal circuitry 21 for the front-edge location function, rather than using prior art separate limited bandwidth integrators for both front-edge location or ground-wave location and foundsignal indication, less complicated and costly apparatus is provided.

While, as before stated, the invention has been particularly described in connection with its important application to Loran-C or similar navigational systems, it is to be understood that the method and apparatus underlying the invention are equally applicable to the locating of predetermined portions of RF pulse envelopes in a wide variety of other applications. Further modifications will also occur to those skilled in this art and all such are considered to fall within the spirit and scope of the invention as defined in the appended claims.

What is claimed is:

1. A method of locating a predetermined cycle in a transmitted pulse envelope, that comprises, monitoring such pulse envelope transmissions; searching for signal information during such monitoring and, upon locating the same, sampling the signal information backwardly in predetermined successive time intervals relatively wide compared with the cycle period until no signal information is detected; sampling forwardly in different narrower predetermined successive time intervals until signal information is detected; and continuing the forward sampling to the said predetermined cycle.

2. A method as claimed in claim 1 and in which the continued said forward sampling is effected until the end of the predetermined cycle is reached.

3. A method as claimed in claim 1 and in which the continued said forward sampling is effected by obtaining the derivative of the pulse envelope signal information and combining the pulse envelope signal information with its derivative to obtain a null point, and varying the position of such null point forwardly along the successive cycles under the pulse envelope.

4. A method as claimed in claim 1 and in which said sampling backwardly is effected while receiving the signal information over a relatively narrow band compared with a relatively wide band of receiving during the forward sampling.

5. A method as claimed in claim 1 and in which said searching is limited to a predetermined search time, after which, if no signal information has been located, the searching is repeated for said predetermined search time over a wider band, after which, if no signal information has been located, said searching is effected for successive search times, each advanced in time from the previous.

6. A method as claimed in claim 1 and in which said searching is limited to a predetermined search time, after which, if no signal information has been located, said searching is effected for successive search times each advanced in time from the previous.

7. A method as claimed in claim 1 and in which said predetermined cycle is located in the leading edge of the transmitted pulse envelope.

8. A method as claimed in claim 7 and in which said transmitted pulse envelope comprises a Loran radio-frequency carrier navigation pulse which is transmitted via ground and sky waves such that the monitoring and searching involves the reception of an initial ground-wave pulse envelope and a subsequent contaminating overlapping sky-wave pulse envelope.

9. A method as claimed in claim 8 and in which said predetermined cycle is the third cycle under the leading edge of the ground-wave pulse envelope and each of the first-named predetermined time intervals is substantially three times the period of said cycle, and each of the said narrower predetermined time intervals is substantially equal to the period of said cycle.

10. A method as claimed in claim 8 and in which said sampling backwardly is effected while receiving the signal information over a relatively narrow band compared with a relatively wide band of receiving during the forward sampling.

11. A method as claimed in claim 10 and in which said narrow and wide bands are respectively adjusted to accommodate for the maximum and minimum time separations, respectively, of ground and sky-wave pulses.

12. A method as claimed in claim 8 and in which the continued said forward sampling is effected until the end of the predetermined cycle is reached.

13. A method as claimed in claim 12 and in which nulling is effected at the end of the predetermined cycle by sampling ahead of the same and comparing with sampling behind the same.

14. A method as claimed in claim 8 and in which the continued said forward sampling is effected by obtaining the derivative of the pulse envelope signal information and combining the pulse envelope signal information with its derivative to obtain a null point, and varying the position of such null point forwardly along the successive cycles under the pulse envelope.

15. Radio-frequency pulse envelope tracking apparatus having, in combination, means for receiving radio-frequency signal pulse information and for determining when received signal information reaches a threshold; means connected with the receiving and determining means for thereupon sampling the signal information backwardly in predetermined successive time intervals relatively wide compared with the cycle period of the radio frequency until no signal information is detected; means connected with the receiving and determining means for thereafter sampling forwardly in narrower predetermined successive time intervals until signal information is detected; and means cooperative with the last-named means for continuing the forward sampling to a predetermined cycle within said envelope and for locking thereupon.

16. Radio-frequency pulse envelope tracking apparatus as claimed in claim 15 and in which said radio-frequency signal information comprises ground and sky-wave transmitted navigation pulses, the latter of which is delayed with respect to the onset of the former but overlaps the same, with said predetermined cycle being selected within the leading edge of the former in advance of such overlap, and in which said receiving means comprises means for receiving such pulses.

17. Radio-frequency pulse envelope tracking apparatus as claimed in claim 15 and in which said locking means comprises means for locking upon the end of such predetermined cycle.

18. Radio-frequency pulse envelope tracking apparatus as claimed in claim 15 and in which said continuing sampling means comprises means for obtaining the derivative of the pulse envelope signal information and combining the pulse envelope signal information with its derivative to obtain a null point, and means for adjusting the position of such null point forwardly along the successive cycles under the pulse envelope to said predetermined cycle.

19. Radio-frequency pulse envelope tracking apparatus as claimed in claim 15 and in which timing means is provided for timing the search time during which said signal is less than said threshold and, after a predetermined search time, for widening the receiving band of said receiving means.

20. Radio-frequency pulse envelope tracking apparatus as claimed in claim 19 and in which means is provided, operable in the event that the widened band searching over a predetermined search time has resulted in no received signal reaching said threshold, for thereupon continuing such searching over such successive search times, each advanced in time from the previous.

21. Radio-frequency pulse envelope tracking apparatus as claimed in claim 15 and in which said receiving and determining means comprise radio-frequency amplifying means connected through sample-and-hold circuit means to analog-to-digital converter means having phase lock and quadrature data outputs, a phase-lock loop, said phase lock loop data output being connected through said phase-lock loop to means for advancing or retarding the sample-and-hold circuit means, and said quadrature data output being connected through limited band integrating means with threshold detector means.

22. Radio-frequency pulse envelope tracking apparatus as claimed in claim 21 and in which said backward and forward sampling means comprise cycle selection means connected with said radio-frequency amplifying means for obtaining the derivative of the received pulse envelope signal information and for combining the pulse envelope signal information with its derivative to obtain a null point and having means for adjusting the position of such null point forwardly along the successive cycles under the pulse envelope to said predetermined cycle; further sample-and-hold circuit means connected to said cycle selection means and feeding further analog-to-digital converter means; and further integrator and threshold detector means connected with said further analog-to-digital converter means for advancing or retarding the first-named sample and hold means.

23. Radio-frequency pulse envelope tracking apparatus as claimed in claim 21 and in which there is provided search timing means, gate means connected with said threshold detector means and controlled by said search timing means, front edge location sequencer means and retard and advance logic circuit means, said gate means being connected through said front edge location sequencer means and said retard and advance logic circuit means to control said phase lock loop.

24. Radio-frequency pulse envelope tracking apparatus as claimed in claim 23 and in which said phase lock loop comprises oscillator means feeding divider chain means, in turn connected with said sample and hold circuit means.

25. Radio-frequency pulse envelope tracking apparatus as claimed in claim 23 and in which said front edge location sequencing means is provided with an output connected with said radio-frequency amplifying means to change the bandwidth thereof in response to the output of said threshold detector and gate means.

* * * * *